United States Patent [19]

Sharma

[11] Patent Number: 5,374,957
[45] Date of Patent: Dec. 20, 1994

[54] DECOMPRESSION METHOD AND APPARATUS FOR SPLIT LEVEL IMAGE BUFFER

[75] Inventor: Aditya S. Sharma, Webster, N.Y.

[73] Assignee: Xerox Corporation, Stamford, Conn.

[21] Appl. No.: 156,760

[22] Filed: Nov. 24, 1993

[51] Int. Cl.⁵ .............................................. H04N 11/06
[52] U.S. Cl. .................................. 348/391; 345/186; 345/199; 358/539
[58] Field of Search ................ 358/539; 348/498, 391, 348/393, 649; 345/186, 199; H04N 11/06

[56] References Cited

U.S. PATENT DOCUMENTS

| | | | |
|---|---|---|---|
| 4,635,048 | 1/1987 | Nishi et al. | 345/186 X |
| 4,823,120 | 4/1989 | Thompson et al. | 345/199 |
| 4,857,993 | 8/1989 | Music et al. | 348/391 |
| 4,908,610 | 3/1990 | Yamamuro et al. | 345/186 |
| 4,980,678 | 12/1990 | Zenda | 345/199 X |
| 5,046,119 | 9/1991 | Hoffert et al. | 348/391 X |
| 5,065,229 | 11/1991 | Tsai et al. | 348/391 |
| 5,124,688 | 6/1992 | Rumball | 345/199 X |
| 5,142,272 | 8/1992 | Kondo | 348/649 |
| 5,254,977 | 10/1993 | MacDonald | 345/186 X |
| 5,276,532 | 1/1994 | Harrington | 358/444 |
| 5,329,292 | 7/1994 | Nishioka et al. | 345/186 |

*Primary Examiner*—Victor R. Kostak
*Attorney, Agent, or Firm*—Oliff & Berridge

[57] ABSTRACT

An apparatus and method to decompress a compressed color page image. Compressed image data and encoding data indicative of the type of encoding used are input into a decoder. The decoder decodes the data into an address. The address is used to select storage data which is used to select a color value or combination of color values, which are output as the decompressed image data.

22 Claims, 4 Drawing Sheets

DECOMPRESSION METHOD AND APPARATUS FOR SPLIT LEVEL IMAGE BUFFER

FIELD OF THE INVENTION

This invention relates generally to an imaging apparatus and method for decompression of color images. More particularly, this invention relates to an imaging apparatus and method for decompression of compressed color page image representations.

BACKGROUND OF THE INVENTION

Modern electronic printers are capable of producing complex page images which may include text, graphics and scanned or computer generated images. The image of a page is described as a collection of simple image components, or primitives (characters, lines, bitmaps or colors). Complex pages can then be built by specifying a large number of the basic image primitives. This is done by a page description language.

An electronic printer's software then receives, interprets, and draws each of the imaging primitives for the page. The drawing, or rasterization must be done on an internal, electronic model of the page. All image components must be collected and the final page must be assembled before marking can begin. This electronic model of the page is often constructed in a data structure called an image buffer. This is an array of color values called pixels. Each pixel corresponds to a spot which can be marked on the actual page and the pixel's value gives the color which should be used when marking. The pixels are organized to reflect the geometric relation of their corresponding spots. They are usually ordered to provide easy access in the raster pattern required for marking.

A quality color printer may have a full 8-bits of storage for each of the three or four color components (red, green, blue, or cyan, magenta, yellow, black). This means that each pixel requires 24 or 32 bits. In a color printer, it is more economical to limit the resolution of the image buffer (the number of pixels per inch) by the information content of the images rather than by the number of spots produced by the marking device. An 8-bit pixel value can specify 256 intensity levels. Because of the great deal of storage required, a split level image buffer is used to save the page image using two resolution levels. The high resolution level has four times as many samples per inch as the low resolution level. The high resolution sampling is used for regions where colors change rapidly, as across component edges. The split level image buffer can be pictured as a grid of low resolution blocks, with some blocks expanding into 4×4 cells of high resolution pixels. When marking occurs, the color value in a low resolution block can be replicated to give 16 values at the high resolution. This structuring of the image gives significant compression. The low resolution blocks specify only one sixteenth of the number of color values as the high resolution blocks.

U.S. patent application Ser. No. 07/797,876 entitled "Split Level Frame Buffer" describes a method to reduce the amount of memory required to construct a full color page image for printing. The method encodes the page images using two resolutions, a low resolution for object interiors and a high resolution for object edges. This patent application is herein incorporated by reference. It is also possible to provide efficient encodings of the high resolution areas for two color patterns, edges separating two colors and ordered regions of three colors. Line graphics and scan pictorial images can be expressed using these encodings resulting in a compression (or reduction of the memory requirements) of up to 16:1.

The split level image buffer is designed so that each block requires thirty-two bits of storage. For low resolution blocks, the thirty-two bits contain a color value. For blocks which expand to high resolution, the thirty-two bits contain an encoding. While some pixels contain color values, others, the high resolution blocks, contain special encodings which can be expanded into 4×4 cells of high resolution color values.

SUMMARY OF THE INVENTION

This invention therefore provides for decompression of color images providing consistent image quality and allowing a reduction in the size of the image buffer.

This invention also provides for decompression of images which are encoded in various different ways.

This invention provides these and other features and overcomes the above and other deficiencies with an apparatus for decompression of compressed color image data, comprising: receiving means for receiving a compressed color image from an image buffer; decoding means for decoding the compressed image into an address; storage selection means for selecting storage data based on the address; and color selection means for selecting at least one color value from a predetermined plurality of color values, the at least one color value representing the decompressed image data.

In another aspect of the invention, the apparatus decompresses compressed color image data and selects at least one color value or combination of color values from a predetermined plurality of color values and combinations of color values, the selected color value representing decompressed image data.

BRIEF DESCRIPTION OF THE DRAWINGS

This invention is described in detail with reference to the following drawings, in which like reference numerals refer to like elements and wherein.

DETAILED DESCRIPTION OF THE PREFERRED EMBODIMENTS

While this invention is described below in detail with specific reference to certain illustrated embodiments, there is no intent to be limited to those embodiments. On the contrary, the invention aims to cover all modifications, alternatives and equivalents falling within the scope of the invention as defined by the claims.

For a general understanding of the features of the present invention, reference is made to the drawings in which like references have been made throughout to designate identical elements. It will become evident from the following discussion that the present invention is equally well suited for use in a wide variety of electronic systems. It is not necessary limited in its application to the particular system shown in FIGS. 1-4.

Figure 1:
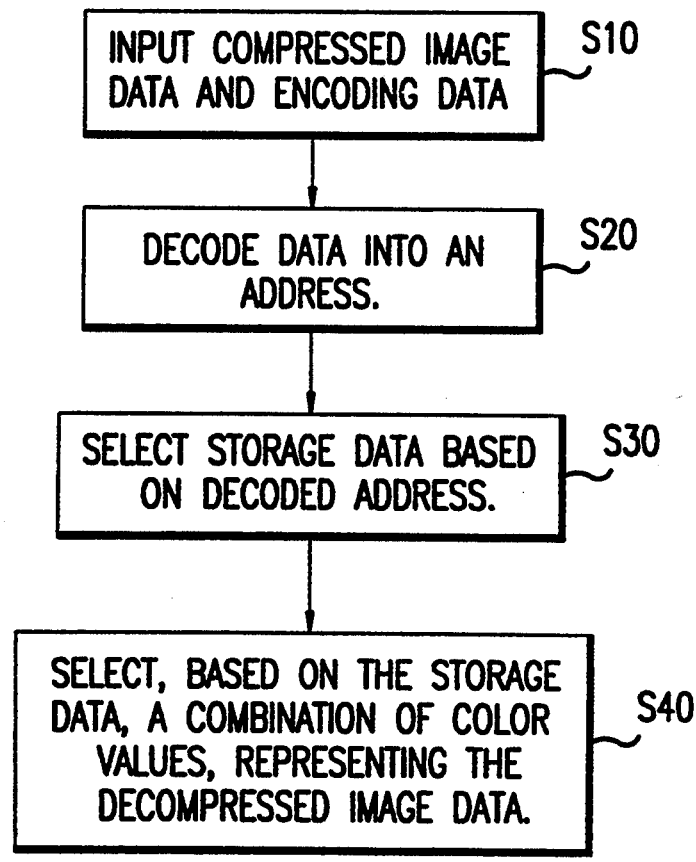
FIG. 1 is a flow diagram showing decompression steps in accordance with one embodiment of the present invention.

FIG. 1 is a flow diagram showing decompression steps in accordance with one embodiment of the present invention. In step S10, compressed image data and encoding data are input. Then, in step S20, the compressed image data and encoding data are decoded into an address. In step S30, storage data is selected based on the decoded address. Finally, in step S40, a combination of color values is selected based on the storage data, the combination of color values representing the decompressed image data.

Figure 2:
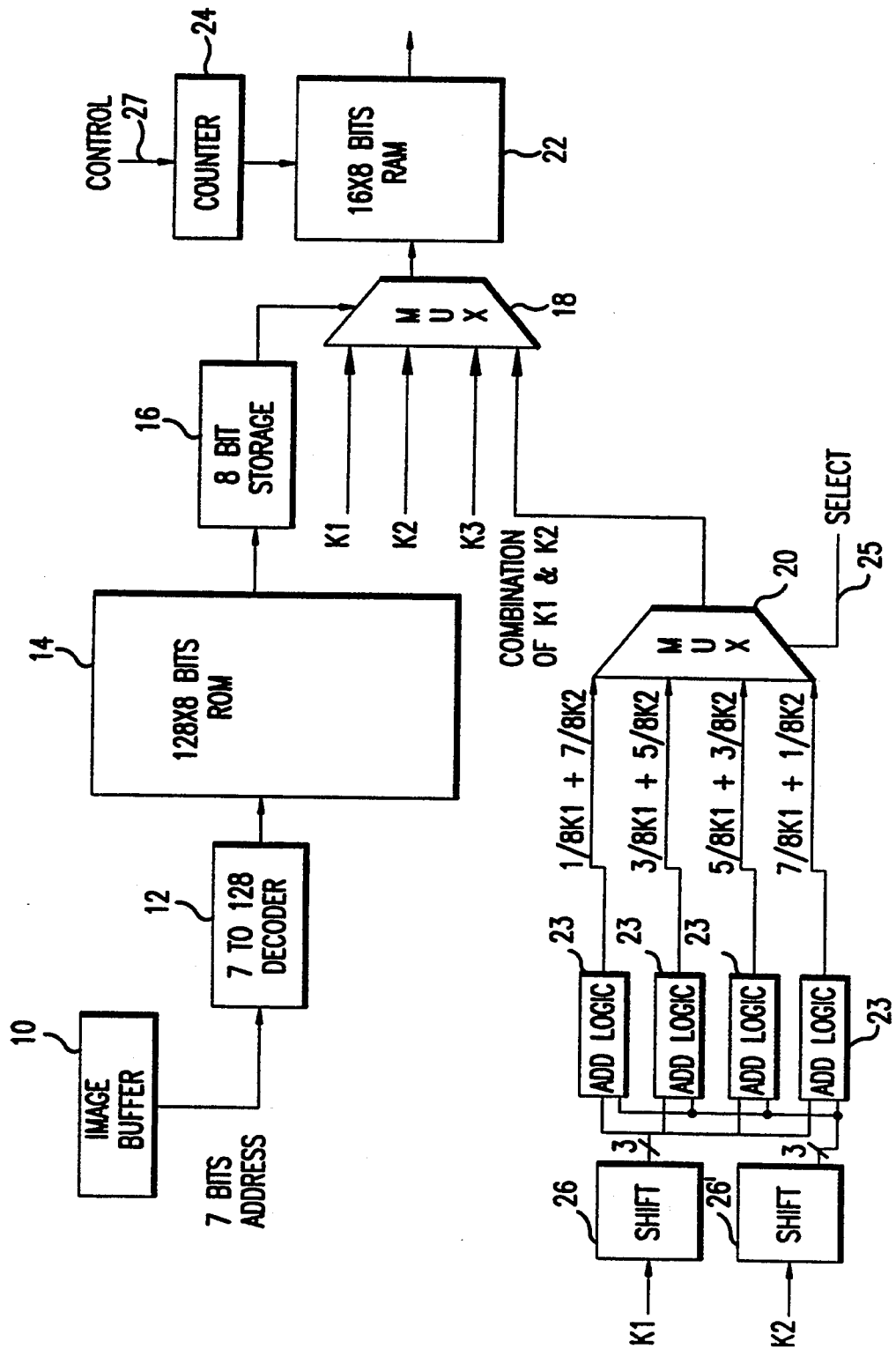
FIG. 2 is a logic diagram showing a decompression system in accordance with one embodiment of the present invention.

FIG. 2 shows a decompression apparatus in accordance with one embodiment of the present invention. In FIG. 2, a split-level image buffer 10 contains page images that have been encoded using two resolution levels. The high resolution level has four times as many samples per inch as the low resolution level. The low resolution sampling is used for portions of the page where color changes slowly, if at all. The high resolution sampling is used for regions where colors change rapidly, for example across component edges. The split level image buffer 10 can be pictured as a grid of low resolution blocks with some blocks expanded into 4×4 cells of high resolution pixels. The split level image buffer 10 is designed so that each block of image requires thirty-two bits of storage. For low resolution blocks, the thirty-two bits contain a color value. For blocks which expand to high resolution, the thirty-two bits contain a type of encoding which can be expanded into 4×4 cells of high resolution color values. Thus, the split level image buffer 10 compresses image data contained in high resolution blocks.

During the marking process, the blocks of the image buffer 10 must be decoded from four bits of data and expanded to a full resolution of thirty-two bits. The image buffer 10 outputs seven bits of information, comprising three bits of encoding data and four bits of compressed image data, to decoder 12. The decoder 12 takes the seven bits of encoding data and compressed image data and decodes the seven bits into one hundred twenty-eight possible addresses. The invention is not limited to the storage selection means (decoder 12) shown in this embodiment.

One of the one hundred twenty-eight possible addresses generated by decoder 12 is used as an address for a ROM 14 and the appropriate byte is selected from ROM 14. Each byte in the ROM 14 is four 2-bit combination of 00, 01, 10 and 11. The eight bits read from the ROM 14 are then input to 8-bit storage device 16, which outputs the eight bits sequentially two bits at a time. Alternatively, each byte in the ROM 14 could be a 4N combination of 00, 01, 10 and 11, where N is any positive integer greater than one.

The eight bits are then fed sequentially two bits at a time from the 8 bit storage unit 16 into the select input of multiplexer 18 which selects a color value or combination of color values. If the two bits fed from the 8-bit storage unit 16 to multiplexer 18 are 00, color K1 is selected. If the 2 bits are 01, color K2 is selected. If the 2 bits are 10, color K3 is selected and if the 2 bits are 11, then a combination of color K1 and color K2 is selected. The invention is not limited to the color selection means (multiplexer 18) shown in this embodiment. Various other selection means could be used in place of multiplexer 18. Additionally, the color selection means could be used to select between more than the three colors K1, K2 and K3 and the combination of colors K1 and colors K2, as shown in this embodiment of the invention.

The combination of colors K1 and K2 are generated by shift circuits 26, adder logics 23 and multiplexer 20. Color K1, represented by eight bits of data, is input into a first shift circuit 26, with one right shift of the bits creating $\frac{1}{2}$ K1, two right shifts creating $\frac{1}{4}$ K1 and three right shifts creating $\frac{1}{8}$ K1. These three fractional values of K1 are output from the first shift circuit 26 as three output lines as shown in FIG. 2. In the same manner, a second shift circuit 26' takes eight bits of color K2 as an input, and with one right shift of the bits creates $\frac{1}{2}$ K2, with two right shifts creates $\frac{1}{4}$ K2 and with three right shifts creates $\frac{1}{8}$ K2. These three fractional values of K2 are output from the second shift circuit 26'. The fractional values of K1 and K2 created by shift circuits 26 are then input to adder logics 23, which add the fractional values of colors K1 and K2. The fractional values of colors K1 and K2 are input to adder logics 23 in such a way as to create four distinct fractional combinations of colors K1 and K2. The color combinations of K1 and K2 thus created are $\frac{1}{8}$ K1 plus $\frac{7}{8}$ K2, $\frac{3}{8}$ K1 plus $\frac{5}{8}$ K2, $\frac{5}{8}$ K1 plus $\frac{3}{8}$ K2 and $\frac{7}{8}$ K1 plus $\frac{1}{8}$ K2.

The combination of colors K1 and K2 created could be varied to any desired fractional combinations or colors other than K1 and K2 could be used to create various color combinations.

The color combinations of K1 and K2 are then input to multiplexer 20, which is controlled by select line 25. Input into select line 25 is the lower two bits of the encoding data, which selects the proper color combination of K1 and K2, which is then input to multiplexer 18.

As discussed above, multiplexer 18 selects either color K1, color K2, color K3 or a combination of colors K1 and K2 in accordance with the two bits supplied by eight bit storage unit 16. The multiplexer 18 then outputs eight bits representing color values K1, K2, K3 or a combination of K1 and K2 to RAM 22 where the values are temporarily stored. Thus, for each four bits of compressed image data originally input from image buffer 10 to decoder 12, multiplexer 18 outputs thirty-two bits of decompressed image data to RAM 22. The thirty-two bits of image data are stored in RAM 22, each eight bits stored in a separate address.

The addressing of RAM 22 is controlled by counter 24. Input into counter 24 is control line 27, which has input into it a row/column access signal. This addressing is necessary because the encoding could be a row-intensive type or a column-intensive type. If the encoding is of the row-intensive type, the thirty-two bits would represent one four-bit row. If the encoding was of the columnintensive type, the thirty-two bits would represent one four bit column. Thus, counter 24 addresses RAM 22 so as to output the four eight-bit color values sequentially in the proper order, regardless of whether the encoding was of the row-intensive type or column-intensive type. In this way, the decompressed image data is output to the print engine (not shown) in the correct format.

The lower four bits of the seven bits sent from image buffer 10 to decoder 12, comprising compressed image data, are updated every x clock cycles, reflecting the next row or column encoded value. The upper three bits of the seven bits sent from image buffer 10 to decoder 12, which are the encoding data, are updated every 4x clock cycles, reflecting the next 16-pixel block of image data (x is the number of clock cycles needed to perform the entire decompression task for each pixel row or column encoded image data).

Figure 3:
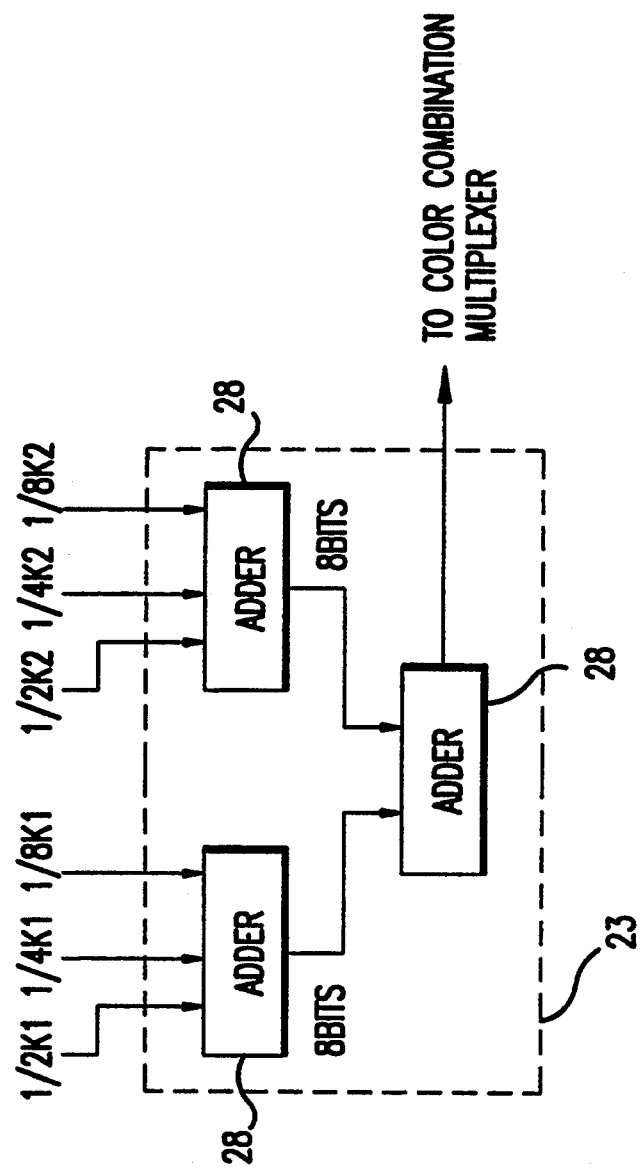
FIG. 3 is a logic diagram showing an adder logic circuit in accordance with one embodiment of the present invention.

FIG. 3 shows a logic diagram of adder logic 23. Each adder logic 23 has three adder circuits 28. Into adder logic 23 is input fractional eight-bit values of colors K1 and K2 from shift circuits 26. The appropriate fractional values of K1 are added together in a first adder circuit 28 and the appropriate fractional values of color K2 are added together in a second adder circuit 28, generating appropriate eight-bit fractional values of colors K1 and K2. The appropriate fractional values of colors K1 and K2 are then added together in a third adder circuit 28. The output of the third adder circuit 28 is then sent to color combination multiplexer 20. Adder logic 23 could be modified in various ways to generate various combinations of colors. For example, different fractional values of colors K1 and K2 could be input into adder logic 23 or adder logic 23 could be expanded to contain more adder circuits 28, thus allowing the generation of combinations containing more than the two color values shown in FIG. 2. In this way, any possible color combinations could be generated by shift and add circuits similar to those shown in FIGS. 1 and 2.

Figure 4:
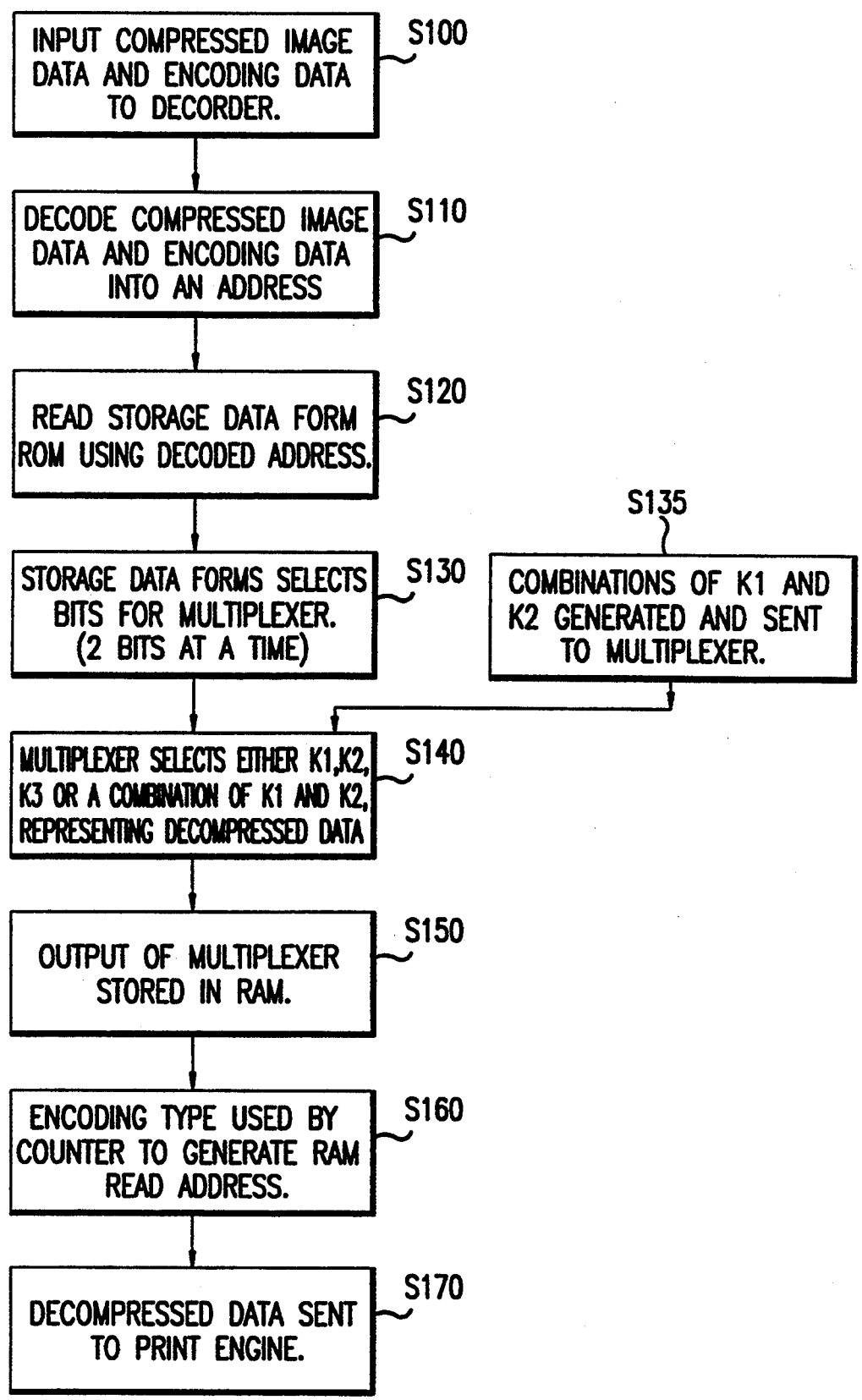
FIG. 4 is a flow diagram showing decompression flow steps in accordance with one embodiment of the present invention.

FIG. 4 shows a flow diagram illustrating the flow of the decompression system shown in FIGS. 2 and 3. In step S100 compressed image data and encoding data are input to a decoder. In one embodiment, as shown in FIG. 2, the decoder is a 7 to 128 decoder 12 with the compressed image data and encoding data are input from image buffer 10.

In step S110, the compressed image data and encoding data are decoded into an address. In the embodiment shown in FIG. 2, the compressed image data and encoding data are decoded into one hundred twenty-eight possible addresses. However, various different sized addresses could be used.

In step S120, the address decoded is used to read storage data from the ROM. As shown in FIG. 2, in one embodiment of the present invention, the ROM is a 128×8 ROM. However, different sized storage devices may be used.

Then, in step S130, storage data is used as select bits for a multiplexer. As shown in FIG. 2, in one embodiment, the storage data output from ROM 14 goes to eight bit storage unit 16, where it is output two bits at a time, each two bits forming a select for multiplexer 18. However, a selection device different than a multiplexer could be used for this task.

In step S135, combinations of colors K1 and K2 are generated and sent to the multiplexer. In the embodiments shown in FIGS. 2 and 3, the various combinations of colors K1 and K2 are generated by shift circuits 26, adder logics 23 and multiplexer 20. Other apparatus could be used to generate the various combinations of colors K1 and K2. In addition, similar circuitry could be used to create combinations of three or more colors.

In step S140, a multiplexer selects either colors K1, K2, K3 or a combination of colors K1 and K2, representing decompressed data. This is accomplished in the embodiment of FIG. 2 by multiplexer 18. Alternatively, the structure could be formed with more than three input colors or a combination of other colors.

In step S150, the output of the multiplexer is stored in a RAM. In the embodiment shown in FIG. 2, the output of multiplexer 18 is stored in RAM 22. Various other storage devices could be used in place of RAM 22.

In step S160, the encoding type is input to a counter which is used to generate a read address for the RAM. In this way, the appropriate address will be read out of the RAM whether the encoding was of the column-intensive type or row-intensive type. In the embodiment shown in FIG. 2, the encoding type is input through a control line 27 to counter 24 which generates the appropriate address to be read from RAM 22.

Finally, in step S170, the decompressed data is sent to the print engine. In the embodiment shown in FIG. 2, the decompressed data is output from RAM 22 as four eight-bit groups of image data sequentially and is sent to a print engine, which is not shown.

While this invention has been described in conjunction with the specific embodiment thereof, it is evident that many alternatives, modifications and variations will be apparent to those skilled in the art. Accordingly, the preferred embodiments of this invention, as set forth herein, are intended to be illustrative, not limiting. Various changes may be made without departing from the spirit and scope of the invention as defined in the following claims.

What is claimed is:

1. An apparatus for decompression of a compressed color image, comprising:
    decoding means for decoding said compressed image into an address;
    storage selection means for selecting storage data from a predetermined set of storage data based on said address; and
    color selection means for selecting data representing at least one color value from a predetermined plurality of color values based on said storage data, said at least one color value representing a decompressed color image pixel.

2. The apparatus of claim 1, further comprising color combination means for combining data representing at least two colors, wherein said color selection means selects data representing a color value or a combination of color values.

3. The apparatus of claim 2, wherein said color combination means comprises:
    a plurality of shift circuits, each of said shift circuits having as an input one of said color values and a plurality of outputs, each of said outputs comprising a shifted, fractional value of one of said color values; and
    an adder logic circuit, a plurality of inputs of said adder logic circuit selectively connected to said outputs of each of said shift circuits, said adder logic circuit adding said fractional values of each of said color values and outputting a predetermined combination of color values comprising the addition of said fractional values of at least two of said color values.

4. The apparatus of claim 1, wherein each storage data selected is comprised of 4N bits, where N is any positive integer greater than 1.

5. The apparatus of claim 4, further comprising means for sequentially inputting each of four two-bit combinations of said 4N-bit storage data from said storage selection means to said color selection means.

6. The apparatus of claim 5, wherein each of said two-bit combinations is used by said color selection means to sequentially select and output a plurality of 4N-bit color values or combinations of color values.

7. The apparatus of claim 6, further comprising storing means for storing each of said eight-bit color values or combinations of color values in separate addresses.

8. The apparatus of claim 7, further comprising data selection means for sequentially selecting each of said addresses in said storing means to be output as decompressed image data.

9. The apparatus of claim 8, wherein said data selection means selects each of said addresses in an order based on whether the data was encoded with a row-intensive encoding or column-intensive encoding.

10. The apparatus of claim 9, wherein said data selection means comprises a counter controlled by a row/-column input indicative of the type of encoding.

11. The apparatus of claim 1, wherein said color selection means comprises a multiplexer.

12. The apparatus of claim 1, wherein said storage selection means comprises a ROM.

13. The apparatus of claim 1, wherein said decoding means comprises a decoder.

14. The apparatus of claim 2, wherein said compressed image is comprised of seven bits.

15. The apparatus of claim 2, wherein said compressed image comprises compressed image data and encoding data.

16. The apparatus of claim 15, wherein said compressed image data comprises four bits, representing four image pixels.

17. The apparatus of claim 15, wherein said encoding data comprises three bits indicative of a type of compression of said image.

18. A method of decompressing a compressed color image, said compressed image including compressed image data and encoding data, comprising the steps of:

decoding said compressed image into an address;
selecting, based on said address, storage data from a predetermined set of storage data; and
selecting an output comprising a color value from a predetermined plurality of color values based on said storage data, said output representing decompressed image data.

19. The method of claim 18, further comprising the step of combining at least two color values, wherein said output is selected from the plurality of color values and the combination of color values.

20. The method of claim 19, wherein said address comprises eight bits, and further comprising the steps of:

separating said eight bit address into four two-bit combinations; and
selecting color values or combinations of color values based on each of said two-bit combinations.

21. The method of claim 20, further comprising the steps of:

storing said color values or combinations of color values; and
outputting said color values or combinations of color values in an order indicative of whether the color image was compressed in a row-intensive manner or a column intensive manner.

22. The method of claim 19, wherein said color combination step comprises the steps of:

inputting each of said color values to a shift register;
shifting said color values with said shift register generating fractional color values; and
selectively adding said fractional color values to obtain said combinations of color values.

* * * * *